United States Patent [19]
De Haan et al.

[11] Patent Number: 5,386,248
[45] Date of Patent: Jan. 31, 1995

[54] METHOD AND APPARATUS FOR REDUCING MOTION ESTIMATOR HARDWARE AND DATA TRANSMISSION CAPACITY REQUIREMENTS IN VIDEO SYSTEMS

[75] Inventors: Gerard De Haan; Hendrik Huijgen, both of Eindhoven, Netherlands

[73] Assignee: U.S. Philips Corporation, New York, N.Y.

[21] Appl. No.: 146,468

[22] Filed: Nov. 1, 1993

Related U.S. Application Data

[63] Continuation of Ser. No. 747,219, Aug. 19, 1991.

[30] Foreign Application Priority Data

Aug. 28, 1990 [EP] European Pat. Off. ............ 90202298

[51] Int. Cl.⁶ ............................................. H04N 7/18
[52] U.S. Cl. .................................. 348/699; 348/431
[58] Field of Search ............... 348/699, 700, 701, 408, 348/401, 402, 413, 416, 420, 431, 452, 451, 384, 399, 400, 404, 407, 409; H04N 7/12, 7/13, 7/18

[56] References Cited

U.S. PATENT DOCUMENTS

| | | | |
|---|---|---|---|
| 3,887,763 | 6/1975 | Hinoshita et al. | 358/138 |
| 4,597,010 | 6/1986 | Carr | 358/136 |
| 4,727,422 | 2/1988 | Hinman | 358/105 |
| 4,838,685 | 6/1989 | Martinez et al. | 358/105 |
| 4,873,573 | 10/1989 | Thomas et al. | 358/105 |
| 5,008,747 | 4/1991 | Can et al. | 358/135 |
| 5,060,064 | 10/1991 | Lamnabhi et al. | 358/105 |

OTHER PUBLICATIONS

G. de Haan et al., "New Algorithm For Motion Estimation", Proceedings of the Third International Workshop on HDTV, Torino, 1989.

*Primary Examiner*—James J. Groody
*Assistant Examiner*—Michael H. Lee
*Attorney, Agent, or Firm*—Michael E. Marion

[57] ABSTRACT

In a method for determining motion vectors for each of the plurality of image blocks (X, O) together constituting a television image, motion vectors are computed only for selected ones (X) of the image blocks, and motion vectors for the remaining ones (O) of the image blocks are interpolated at least in part from the computed motion vectors of the selected blocks.

6 Claims, 2 Drawing Sheets

| X | O | X | O | X | O | X | O | X | O | X | O | X | O |
|---|---|---|---|---|---|---|---|---|---|---|---|---|---|
| O | X | O | X | O | X | O | X | O | X | O | X | O | X |
| X | O | X | O | X | O | X | O | X | O | X | O | X | O |
| O | X | O | X | O | X | O | X | O | X | O | X | O | X |

FIG.1

| X | X | X | X | X | X | X | X | X | X | X | X | X | X |
|---|---|---|---|---|---|---|---|---|---|---|---|---|---|
| O | O | O | O | O | O | O | O | O | O | O | O | O | O |
| X | X | X | X | X | X | X | X | X | X | X | X | X | X |
| O | O | O | O | O | O | O | O | O | O | O | O | O | O |

FIG.2

| A | D | G | J | M |
|---|---|---|---|---|
| B | E | H | K | N |
| C | F | I | L | O |

FIG.3

METHOD AND APPARATUS FOR REDUCING MOTION ESTIMATOR HARDWARE AND DATA TRANSMISSION CAPACITY REQUIREMENTS IN VIDEO SYSTEMS

This is a continuation of application Ser. No. 07/747,219, filed on Aug. 19, 1991.

BACKGROUND OF THE INVENTION

The present invention relates to video image signal processing for storage or transmission systems in which motion vectors are calculated to allow subsequent interpolation either of additional lines in each field or of additional fields.

Many algorithms for motion estimation have been developed. One of these is disclosed in an article "New algorithm for motion estimation" by Gerard de Haan and Henk Huijgen, Proceedings of the Third International Workshop on HDTV, Torino, 1989.

SUMMARY OF THE INVENTION

It is inter alia an object of the present invention to simplify the motion estimator hardware and/or decrease the data transmission/storage capacity requirement, e.g. in a system in which a television field has been divided into a plurality of blocks and it is required to calculate motion vectors to each of these blocks.

One aspect of the present invention provides a method or system in which motion vectors are computed for selected ones of the blocks, the vectors for the remaining blocks being derived by interpolation from the computed motion vectors. The invention is set out more precisely in the annexed claims 1, 6, 8 and 9.

Additional aspects, advantages and details of the manner of operation of the present invention will become clear with reference to the following description taken in conjunction with the drawings.

In the drawings:

BRIEF DESCRIPTION OF THE DRAWINGS

FIG. 1 illustrates a first pattern of interleaving blocks for which a motion vector is calculated with those for which a motion vector will be interpolated at the display end;

FIG. 2 illustrates an alternate pattern for that of FIG. 1;

FIG. 3 is an expanded view of one section of FIG. 1;

DETAILED DESCRIPTION OF THE PREFERRED EMBODIMENTS OF THE INVENTION

The terms "television" and "video" are used interchangeably throughout this application. It will be appreciated that the invention is applicable in other than strictly defined "television" fields (e.g. conferencing systems). Similarly, although "odd" and "even fields" are mentioned, the invention is also applicable to sequential scan systems in which the sequential "fields" are, technically, frames.

As mentioned above, the present invention concerns itself with video systems in which the image is subdivided into a number of blocks. In FIG. 1, in known systems, this subdivision would include all the blocks, both those marked "X" and those marked "O". For each of these blocks a motion vector would be calculated. The calculation as such is not part of the present invention. The only assumptions made are that a motion vector is assigned to each block, that the calculation of such motion vectors is relatively complicated and that storage and/or transmission of such vectors requires corresponding storage and/or transmission capacities.

The present invention causes a reduction in hardware, computation time, and storage/transmission capacity by requiring that only half of the number of vectors is calculated at the transmitting or recording end and then stored and/or transmitted, or, alternatively, calculated at the receiving or display end. The remaining vectors, according to the present invention, are calculated with a simple algorithm from the vectors associated with the other blocks.

The present invention will be discussed in detail with regard to the interleaving scheme or pattern of FIG. 1, where "X" indicates the blocks for which the vector is calculated in odd fields, while "O" indicates the blocks for which the vector is calculated in even fields. Obviously, these could be reversed or a completely different scheme, for example that shown in FIG. 2, could be used. A reason for discussion of the scheme in FIG. 1 at this time is that simulation has shown that the overall image display quality of the system is virtually unchanged for this particular pattern. Further, the problem of interpolation of the missing motion vectors for the scheme of FIG. 2 is very similar to the problem of progressive scan conversion of an interlaced television signal. The many known techniques for progressive scan conversion can thus readily be applied here as well, so that no further discussion of the FIG. 2 system is required.

Figure 4:
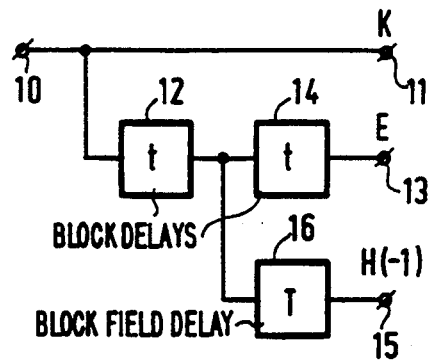
FIG. 4 is a block diagram of a delay structure for component interpolation in the horizontal direction.
Figure 6:
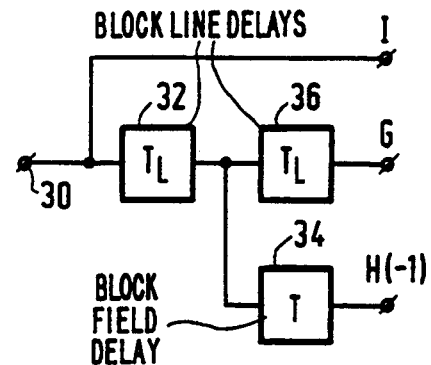
FIG. 6 is a block diagram of a delay structure for component interpolation in the vertical direction.
Figure 7:
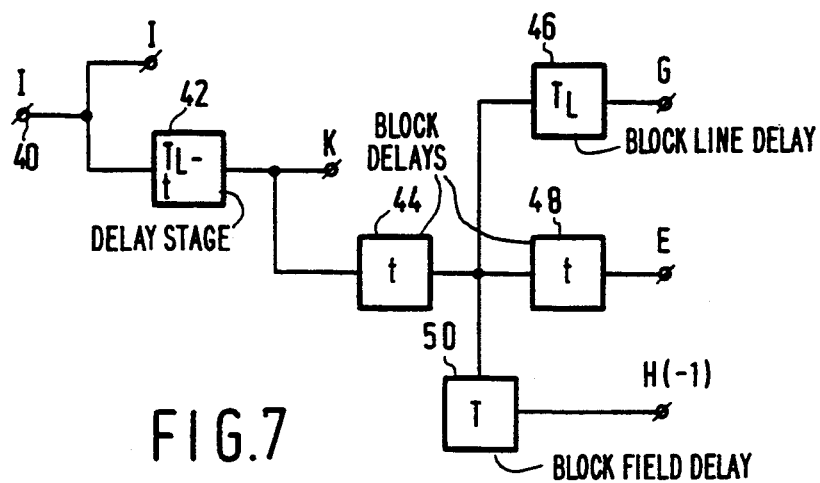
FIG. 7 is a block diagram of the delay structure for cascaded horizontal-vertical component interpolation.

Returning now to FIG. 1, in a preferred embodiment vectors are assigned to blocks for which no vector was calculated on the following basis. The x and y components are determined separately by selecting the median value of the corresponding component in at least two adjacent blocks and the corresponding component in the same block in the previous field. For the following discussion, reference should also be made to FIG. 3, in which letters are assigned to each block in the vicinity of a block H for which the x and y components of a motion vector are to be found. The delays in FIGS. 4, 6 and 7 are marked t for a block delay, T for a one block field delay, and $T_L$ for a one block line delay. For deriving the missing vectors by median interpolation utilizing the two blocks, E and K, directly adjacent in the horizontal direction, the delay hardware illustrated in FIG. 4 may be used. If the interpolation is for the x-components of the motion vectors, the signals supplied to terminal 10 are the computed E and K x-components.

Figure 5:
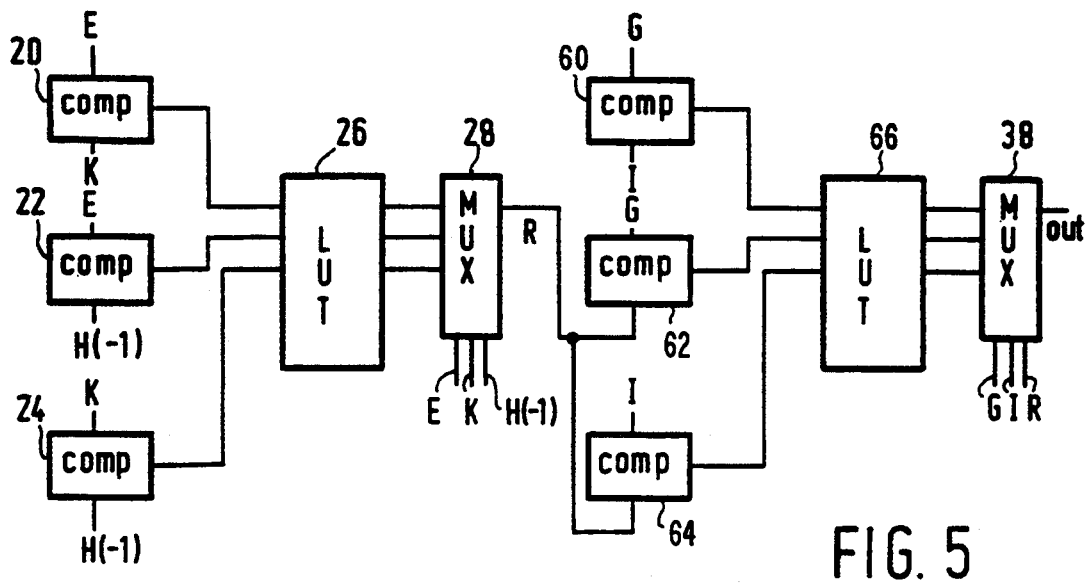
FIG. 5 is a block diagram of a median motion vector component calculating circuit.

If it is assumed that the incoming component is the x-component of the K motion vector, then K is available at output terminal 11. Input terminal 10 is also connected to a one block delay 12 which, in turn, is connected to a one block delay 14 and a one block field delay 16. At a second output terminal 13, connected to the output of delay stage 14, the x-component of the motion vector associated with block E is present, while at a terminal 15 at the output of block field delay 16 the x-component of the H-vector of the previous field will be available. The H-vector of the previous field is indicated by H(−1). These values may be applied to comparators 20, 22 and 24 as indicated in FIG. 5. The sign output of each comparator is applied to a look-up table (LUT) 26 whose output controls a multiplexer (MUX) 28. In accordance with the control signals furnished at the output of look-up table 26, multiplexer 28 will select the median value among E, K, and H(−1). This is indicated as R at the output of multiplexer 28. This value alone could be used as the x-component for the motion vector associated with block H in FIG. 3. The same circuit as that shown in FIG. 4 would be utilized to derive the y-component.

Alternatively, the x- and y-components of the motion vector to be assigned to block H could be derived from the corresponding components in vertically adjacent blocks I and G, as well as the value of the vector component assigned to block H in the previous field. The relevant delay structures are illustrated in FIG. 6. The x- (or y-) components of the motion vectors are received at a terminal 30. If it is assumed that at the particular time instant the motion vector component corresponding to block I is received, then one block line delay 32 plus one block field delay 34 later, the vector value assigned to block H in the preceding field will be available. Finally, the value of the motion vector component associated with block G will be available at the output of one block line delay 36. If the values of the motion vector component associated with blocks I and G were substituted for those indicated by E and K in FIG. 5, the output R of multiplexer (MUX) 28 would be another estimate for the x-component (or the y-component) of the motion vector associated with block H. Either the interpolation scheme illustrated in FIG. 4 or that is illustrated in FIG. 6 could be used.

Further image improvement would result if, instead of arbitrarily selecting either the horizontal or the vertical interpolation scheme as illustrated in FIGS. 4 and 6, respectively, a decision between vertical or horizontal interpolation were made on the basis of changes in the vector field. For example, the median could be taken in the direction with a smallest difference between the vectors calculated for the two adjacent blocks. If the difference is larger in the vertical direction, a horizontal interpolation would be carried out and vice versa.

However, best results have been obtained by use of the complete circuit in FIG. 5. For this purpose, the delays illustrated in FIGS. 4 and 6 would be combined as shown in FIG. 7. Here, the motion vector component, either the x-component or the y-component, is received at a terminal 40. The component undergoes a delay of one block line minus one block in a delay stage 42. The output of stage 42 is the vector associated with block K. After a further block delay in a stage 44, the motion vector component signals are applied to a block line delay 46 which therefore yields the motion vector associated with block G at its output. The output of delay 44 is further applied to an additional block delay 48 whose output therefore yields the motion vector associated with block E. Finally, the output of delay block 44 is applied to a block field delay 50 whose output is the value of the motion vector associated with the H block of the previous field.

All of the above mentioned signals, i.e. motion vector components, are applied to correspondingly designated terminals in FIG. 5. The motion vectors associated with blocks E, K and H(−1) are applied to comparators 20, 22 and 24 as described previously. The motion vectors associated with blocks G and I are applied, again as indicated in FIG. 5, to comparators 60, 62 and 64. The second input of comparators 34 and 64 is the signal R at the output of multiplexer 28, i.e. the median value found by interpolation in the x-direction. These sign signals at the outputs of comparators 30, 32 and 34 are applied to a second look-up table 66 which controls a multiplexer 38 to output the median value of G, I and R. In this last embodiment, the vector value for block H in the present field was thus computed from the vector values in the 4 neighboring blocks E, K, G and I and the vector in the former field at the position of block H. The circuits of FIG. 7 and 5 for this last embodiment of the present invention will be required twice, once for the x-component of the vectors, and once for the y-component of the vectors. In addition, the computed values of the motion vectors and the interpolated values have to be interleaved either directly by multiplexers or upon read-out from memory.

From the above discussion it will be clear that above aspects of the present invention, are entirely independent of the particular algorithms by which motion vectors may be derived and that the calculation of motion vectors for selected blocks only and the interpolation of motion vectors of the remaining blocks from values derived from blocks having calculated motion vectors may be implemented in many different ways which will readily be apparent to one skilled in the art. A preferred motion estimation method is discussed below.

The processing power required for a block matching motion estimation algorithm increases almost linearly with the number of pixels in the blocks. In the recursive motion estimation algorithm of the article mentioned in the introduction, where vectors are determined not only by the pixels in the block, but also by the neighboring blocks, the sensitivity for subsampling appeared to be not very high. This was verified with a subjective test and by calculating the average squared pixel differences between an interpolated and an original field in a number of test sequences. The influence of subsampling on the Mean Square Error (MSE) is small up to a subsampling factor of four, as can be seen from table 1.

| S | 2 | 4 | 6 | 8 |
|---|---|---|---|---|
| MSE | 0% | 1% | 4% | 6% | effect of subsampling factor (S) on matching error (MSE).

Two further conclusions were drawn from experiments:
1. The subsample pattern should cover the largest possible area of the block,
2. A homogeneous distribution of pixels seems best (a subsample pattern having a denser sampling in the centre was tested, but appeared to yield worse results than a homogeneous distribution.

As covered area seems to be of more importance than the number of pixels in the block, the density of pixels was further reduced, while at the same time the block area was extended (so that the amount of pixels in the blocks remains the same). One tested subsample pattern covers a block having a size of 16 pixels by 4 lines, each line containing, however, only 4 samples in a quincunx subsample pattern. The vectors calculated for this block of 16×4 assigned to a block of 8×4. So the blocks on which the match is calculated, are wider than the blocks to which the vectors are assigned, which implies that the information can be subsampled by a factor of four so that the size of the field delay furnishing the samples of the preceding field can be reduced by the same factor of four.

Additional to the hardware advantage this pixel subsampling and block widening technique appeared to yield increased quality; the wide blocks with lower density (16 pixels) gave a lower MSE than the normal (8×4) blocks without subsampling (32 pixels).

If this pixel subsampling and the block subsampling described hereinbefore are combined, no access is required to pixels more than once, which multiple access would be unattractive as it would require a more complex hardware.

Further it was verified that the result obtained by the combination of pixel subsampling and block subsampling is better than the result obtained with subsampled wide blocks (16×4, 16 pixels) and no block subsampling.

We claim:

1. Apparatus for determining motion vectors for each of a first group of image blocks together constituting a television image, comprising: first means for computing first motion vectors based on a second group of image blocks, said second group of image blocks comprising fewer image blocks than said first group of image blocks, and second means for interpolating second motion vectors based on a third group of image blocks not included in said second group of image blocks, based at least in part on said first motion vectors.

2. Apparatus as claimed in claim 1, wherein said group of image blocks are alternate blocks along each line of each field.

3. Apparatus as claimed in claim 2, wherein the alternate lines in each field have a one block line offset with respect to each other.

4. Apparatus as claimed in claim 1, wherein the third means computes, for each of said second group of image blocks, the median motion vector component of each of the corresponding first motion vector components of two adjoining blocks of said second group of image blocks and the first motion vector component of a block of said second group of image blocks occupying the same position in a previous field.

5. Method for determining motion vectors for each of a first group of image blocks together constituting a television image, said method comprising the steps of: computing first motion vectors based on a second group of image blocks, and interpolating second motion vectors based on a third group of said image blocks not included in said second group of image blocks, based at least in part on said first motion vectors.

6. A method as claimed in claim 5, wherein the interpolation of said second motion vectors comprises the step of finding a median of computed motion vector components in adjoining blocks of the same field and a computed motion vector component from a previous field.

* * * * *